(12) United States Patent
Begum

(10) Patent No.: US 6,177,880 B1
(45) Date of Patent: Jan. 23, 2001

(54) AUTOMATED SHOPPING CART HANDLE

(75) Inventor: Paul G. Begum, Salt Lake City, UT (US)

(73) Assignee: Klever-Kart, Inc., Salt Lake City, UT (US)

(*) Notice: Under 35 U.S.C. 154(b), the term of this patent shall be extended for 0 days.

(21) Appl. No.: 08/090,285

(22) Filed: Jul. 12, 1993

Related U.S. Application Data

(63) Continuation-in-part of application No. 07/821,079, filed on Jan. 16, 1992, now abandoned.

(51) Int. Cl.[7] ....................................................... G06F 7/04
(52) U.S. Cl. ..................................................... 340/825.35
(58) Field of Search ......................... 280/33.992; 235/383, 235/385; 364/401; 40/308, 482; 345/168, 169, 173, 146; 340/825.35, 825.32

(56) References Cited

U.S. PATENT DOCUMENTS

| | | | |
|---|---|---|---|
| D. 328,607 | * 8/1992 | Brennan | D18/7 |
| 4,750,151 | * 6/1988 | Baus | 340/825.35 |
| 4,786,889 | * 11/1988 | Hayasaka | 340/407.1 |
| 4,868,544 | * 9/1989 | Havens | 280/33.992 |
| 4,882,724 | * 11/1989 | Vela et al. | 340/825.35 |
| 4,973,952 | * 11/1990 | Malec et al. | 340/825.49 |
| 5,111,196 | * 5/1992 | Hunt | 340/825.35 |
| 5,158,310 | * 10/1992 | Tannehill et al. | 340/825.32 |
| 5,250,789 | * 10/1993 | Johnsen | 364/401 |

FOREIGN PATENT DOCUMENTS

2035225 * 6/1980 (GB) ............................. 280/33.992

* cited by examiner

Primary Examiner—Chris S. Kelley
(74) Attorney, Agent, or Firm—Richard Esty Peterson Patent Attorney

(57) ABSTRACT

An electronic shopping-cart handle with a hand bar and a display unit having an informational display screen for a product directory and periodic display of advertisements, the display unit having operating controls operable by a user's thumbs while maintaining a hand grip on the hand bar for displaying select user information on the display screen.

23 Claims, 3 Drawing Sheets

AUTOMATED SHOPPING CART HANDLE

This application is a continuation-in-part of my application, Ser. No. 07/821,079, filed Jan. 16, 1992 abandoned of the same title.

BACKGROUND OF THE INVENTION

This invention relates to an electronic shopping cart handle, and in particular to a unitary, shopping cart handle and informational display that is ergonomically designed for ease of use. This shopping cart handle relates to the invention described in the Patent Application entitled, Device for Providing Advertising to Shoppers, Ser. No. 608,167, filed, Nov. 1, 1990. In that application, a shopping cart handle was described having an integral electronic display with different embodiments of input controls, including a keyboard adjacent to or under the display.

Two prior art systems for notifying shoppers of promotional items at the location of the promoted items have been described. In one system, Malec, U.S. Pat. No. 4,973,952 entitled, "SHOPPING CART DISPLAY SYSTEM," a method for point of purchase promotions has been disclosed in which a series of address identified promotional screen graphics are stored in memory. A plurality of triggering units are positioned throughout the marketing area, each strategically located proximate a promotional item. Each triggering unit transmits an address signal to the receiver of a display unit on any mobile shopping cart in the area. The address signal is specific to the memory location of the screen graphic for the item promoted at that location. The coded address signal is processed by the display unit to locate the crossreferenced screen graphic corresponding to the promoted item to display the screen graphic in a display screen on the display unit.

The advantage of this system is that only a short address code need be transmitted within the brief window of time available while the shopper is passing the location of the promoted item.

A second system is disclosed in Vela, et al. In its primary embodiment, this system has a similar arrangement of components. The strategically located transmitter units, however, transmit a message signal in a burst mode representing the screen graphic of the promoted item at that location. The burst signal is held in a buffer register and processed by a central processor in the display unit and be displayed on the display screen of the display unit.

The advantage of this system is that the memory of all the display units need not be reprogrammed at once by a central location to change a promotional graphic. Display units on shopping carts not in the area of reception of the reprogramming signal may be missed, for example, when in the parking lot or being serviced. The disadvantage is that the burst signal attempts to convey so much data within such a brief window of time that data may be lost and a display error may result.

The system utilized in this invention is a hybrid system that differs in operation from either of the described systems, but combines certain features of each.

The system of this invention utilizes similar components with the locationally specific transmitting unit transmitting a digitized message signal representing the screen graphic together with other product control signals related to the promoted item such as the universal product identification number, bar code, date or iteration of the promotional graphic, and the identity of the transmitting unit. The transmitted screen graphic signal is compared with a memory file of stored screen graphics and if a match is found, the stored memory graphic or the signal transmitted graphic is displayed. Often, using the standard checksum procedure, the stored memory graphic can be validated and displayed before completion of transmission of the message signal.

If there is no match, the signal transmitted graphic is stored into the memory of the display unit and the signal transmitted graphic is simultaneously displayed on the screen of the display unit. Similarly, if there is a match but the transmitted graphic is an updated version, then the stored memory graphic is dated and replaced with the updated signal transmitted graphic.

The advantage of this system is that each display unit on each shopping cart is updated as it passes within range of the locationally specific transmitting unit. When promotional items are replaced or updated, only the promotional graphic of the specific transmitting unit being updated need be replaced. This system also has the advantage of enabling a shopper to access the memory file of stored screen graphics in his shopping cart display unit and scrolling through the promotional graphics to review the items that may be on sale.

It has been found that shoppers utilizing a shopping cart with an electronic display prefer a device having a minimum number of operating controls. Simplicity of operation is critical for acceptance of an electronic shopping aid operable by the shopper while shopping. The diversity of shoppers confronted with an electronic device of this type requires that use be practical and simple for all. A device that is nimble, easy to operate, and does not interfere with the customary complexities of shopping in a large supermarket is greatly preferred.

Prior devices have been far too complex and have diverted the shopper's attention from the primary activity of shopping. The task of attempting to learn complicated and intimidating computer control procedures is one that is consciously avoided by the general consumer. For example, it is remarkable that although there is a universal acceptance and use of video recorders, only a small percentage of users know how to pre-record television programs. The procedural complexity involved renders this innovative feature an unused curiosity to all but the most determined.

The two features that shoppers find most convenient and desirable in a shopping cart informational aid are the locations of different types of items in the store, and the availability of special sale items. In the referenced application, preferred means of directing the shopper to the location of categories of items, and methods of notifying shoppers of sale items were disclosed. The systems therein described are incorporated herein by reference.

The primary object of this invention is to devise a improved, unitary, shopping cart handle that combines style, utility, and simplicity such that a user achieves an immediate familiarity with the device and its operation. The controls must thereby be intuitive and not intimidating, allowing users to confidently operate the device without instruction. As an added feature to the graphical display, the handle of this invention includes a cue signal to alert the shopper to an advertisement or a sale item being displayed on the central display screen.

In addition to the foregoing design criteria, the electronic shopping cart handle must be operated in a difficult environment that requires the device to be subjected to a great deal of physical abuse. The device is subjected to abusive handling by infants and small children who may be riding in carrier seats in the shopping cart. The device must withstand inadvertent contact with cans, bottles and other hard objects that may strike the handle when placed into the cart by an inattentive shopper. Furthermore, the device must be designed to withstand the outdoor environment when the cart is wheeled from the store to the shopper's car. Finally, the shopping cart handle must be low in initial cost and have little other use, making it an undesirable target of theft. Preferably, the device includes an anti-theft alarm that signals the removal of the handle from the cart or the removal of the cart from a designated area. These and other features must be incorporated into a compact unit that includes a visual display, user controls, and a physical construction that maintains its ordinary function as a push-bar for the shopping cart.

SUMMARY OF THE INVENTION

This invention comprises a unitary shopping cart handle combining a visual display for use as an informational aid, and a utilitarian hand bar for propelling and guiding a shopping cart. The electronic shopping cart handle of this invention is designed with a visual display and a minimum number of user controls for simplicity of operation. The informational features of the electronic device must not interfere with the fundamental function of the shopping cart handle, which is to move the shopping cart around the supermarket or department store. The preferred embodiment of the shopping cart handle of this invention includes two or three control buttons and allows the user to operate the controls while continuing to utilize the shopping cart handle for its underlying function of guiding the shopping cart. Key to this operation is a control system that allows the user to maintain a hand grip on the guide bar while manipulating the controls to the electronic display. The preferred design reduces the number of controls to simple thumb controls.

In the preferred embodiment, the electronic shopping cart handle includes a low-profile, central display screen and a minimum of two thumb controls for selecting the directories and scrolling the lists, which are displayed in the display screen. An optional third control comprising an elongated cross bar is included to multiply the options of the scroll buttons.

In the usual environment where a shopping cart is useful, such as a large supermarket or discount hardware depot, the shopper has a mindset geared for the business of shopping. Generally referring to a prepared written or mental list, the shopper routes through the store with an attitude geared toward efficiency. In one study of a focus group of shoppers confronted with electronic shopping aids added to a shopping cart, there was a general preference for an aid that was both informative and minimally intrusive. The manner in which a shopping aid conveys commercial information was found to be very important to acceptance of the aid device. To the extent the commercial message is simply for product identification, consumers appear to be annoyed by the distraction. However, if the commercial message informs about special sale items and provides pricing, the intrusion was found to be acceptable.

Furthermore, the manner of alerting the shopper to the message was deemed important. Substituting a pleasing chime for an annoying buzzer may make a substantial difference whether a shopper's attention is directed to the display screen or the sound filtered from consideration. Furthermore, adding the chance to win a prize on viewing the display screen may encourage the viewing of randomly activated commercial sales messages.

Clearly to be effective, the information must be delivered in a convenient format. Shoppers view a device of the type disclosed as an opportunity to receive practical shopping information that would make their experience at the shopping market more efficient and productive. To fulfill this expectation, the device must be easy to use without an in-store tutorial or protracted demonstration. The device must provide useful information without appearing as a commercial intrusion. The invented device provides the physical embodiment and the informational format necessary to satisfy these objectives.

The electronic shopping cart handle of the preferred embodiment includes an internal operating system that enables the device to incorporate efficient power management in order to maximize the life of the power pack that is provided for each device. The device is designed to be powered by standard C or D alkaline batteries, which can be replaced periodically. Preferably, the device is powered by specialized rechargeable lithium batteries for longer in-time service and reduced long-term power pack costs. Additionally, in order to prolong battery life the power pack is supplemented with a radiation cell bank that generates a trickle power from overhead microwave or infrared beacons in the shopping market. Finally, the relatively small, low profile, display screen is sized to maximize battery life by reducing the power demand of the component that is the dominant power user.

The relatively small screen is also sized to coordinate the transmission of the graphic signal to the display unit of the shopping cart handle in the limited window of time available for transmission. Depending on the baud rate, the display screen must be limited in size and resolution, and availability of colors, such that the entire screen graphic can be transmitted within approximately two seconds available as an maximum transmission time. Since the point of purchase promotion is most effective when the customer is at ground zero, that is, proximate the shelf location of the promoted item, the graphic must be transmitted, received and formatted for display in the brief time that the shopper is strolling past the promoted item.

Because of improved design of compact integrated chip technologies use of an integrated chip incorporating an entire computer on a chip is preferred. This selection allows the essential processor and memory unit to be extremely compact allowing the low-profile configuration of the electronic shopping cart handle described in this specification. The use of integrated chips, particularly those incorporating efficient power management, and the use of a low-profile display screen coupled by a large volume, power pack, enables substantial reduction in costly maintenance resulting from the periodic task of recharging the power pack. Because many competitive supermarkets are open 24 hours a day, removing carts from service must be accomplished during off-hours and must involve less than all of the inventory of carts. The invented device is a dedicated appliance computer that is capable of being reprogrammed in order to add additional features to the device as users become more sophisticated. Such features as the automatic display of advertisements at select store locations and the global updating of displayable data by wireless transmissions are described in the referenced application. The infrared or radio frequency receiver in the handle, used for an alarm when the cart or handle leaves a prescribed area, also be used to receive an advertisement signal by appropriate programming as described. This application is primarily directed to the user interface from the perspective of the physical device and informational format. The user interface is designed to allow the user to access all of the available data including stored promotional graphics by a control system that is intuitive. Furthermore, the hybrid system devised for automatic display of promotional graphics, is designed to incorporate features that are beneficial in facilitating automatic update of the promotional advertisements. Certain features are also beneficial to the user who has an opportunity to voluntarily scroll through the promotional items to determine if there is anything of particular interest. A further advantage of the hybrid system is for the benefit of the store operator by providing a separate promotional program for advertisers, in which a screen graphic of the promoted item is displayed from memory periodically during the use of the shopping cart by a shopper without regard to the cart's location in the marketing area. These and other features will become apparent from a consideration of the Detailed Description of the Preferred Embodiment.

DETAILED DESCRIPTION OF THE PREFERRED EMBODIMENTS

Figure 1:
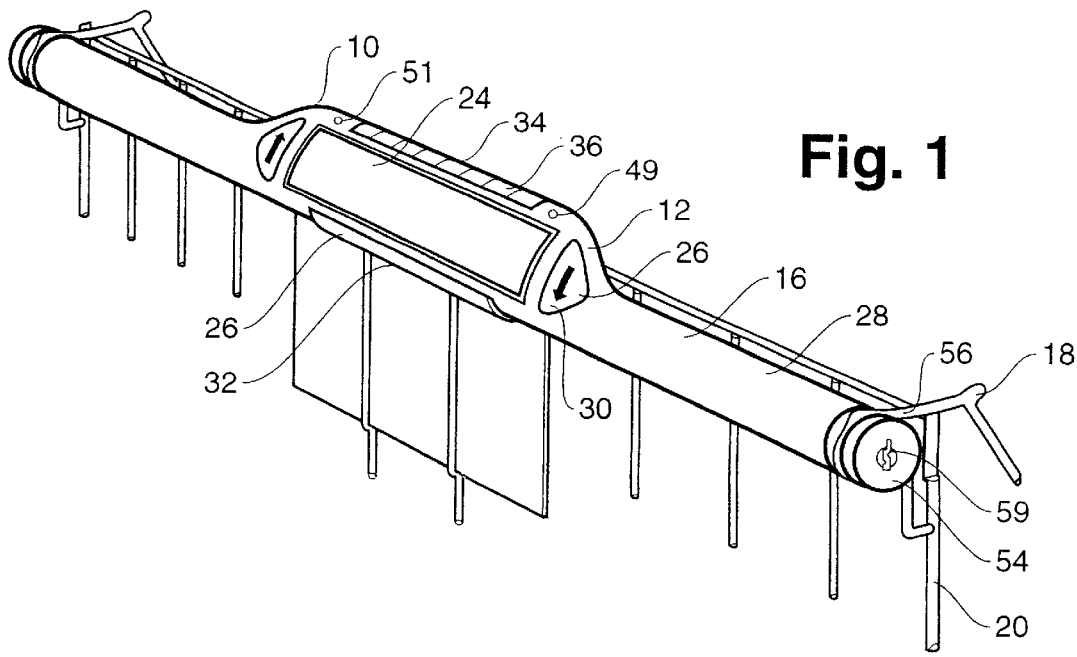
FIG. 1 is a perspective view of the electronic shopping-cart handle and a portion of a conventional shopping cart.

Referring to FIG. 1, the electronic, shopping-cart, display handle of this invention, designated generally by the reference numeral 10, combines an electronic display unit 12 with a hand bar 16 of a shopping cart 18 to produce an ergonomically designed, informational aid for shoppers. The display handle 10 is mounted to the frame structure 20 of a conventional shopping cart 18, a portion of which is shown in FIG. 1. The unitary construction of the display unit 12 and hand bar 16 allows the handle 10 to adopt a contoured, low-profile configuration that minimally interferes with the traditional operations of moving the cart and placing purchased items into the cart. Importantly, the handle is shaped without sharp edges or corners that may injure a child transported in the cart, and is designed to optimize the visibility of a centrally located display screen 24 without blocking the shopper's view of the contents of the shopper's cart.

Figure 11:
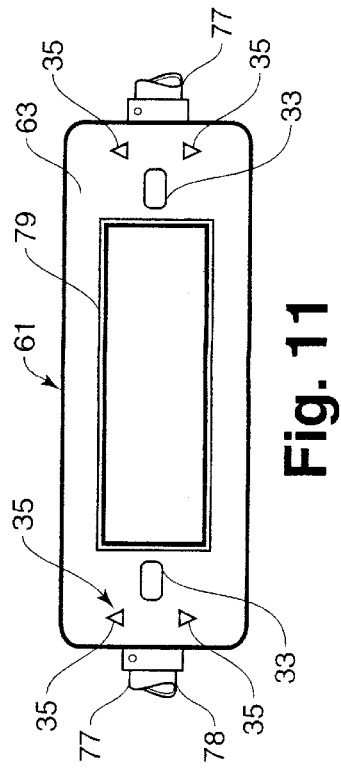
FIG. 11 is a schematic illustration of an alternate configuration of a display unit.

The display unit 12 includes a minimum number of operator controls 26, and in the preferred embodiment, the controls are operable by the shopper's thumbs without removal of the shopper's hands from hand grip sections 28 of the hand bar 16. The primary operator controls are scroll buttons 30 mounted on each side of the display screen 24. In the simplest embodiment of the invention, the display screen automatically displays periodic promotional items and the user controlled feature is limited to a categorical product directory. The scroll buttons allow a user to scroll up or down the product category list to find the location of selected items in the product directory.

Where greater flexibility is required, for example, where there are multiple directories or hierarchical lists, a selection bar 32 is included, as shown. The selection bar 32 is centrally positioned below the screen 24 and can be accessed by either thumb. The selection bar 32 can be replaced with two spaced selection buttons 33 located proximate dual scroll buttons 35 on each side of the screen 24 as shown in FIG. 11. This allows full control by a single thumb of either hand. The selection bar 32, and functionally equivalent selection buttons 35 expands the programmable features that can be incorporated as discussed hereafter and can be operated alone or in conjunction with one or both the scroll buttons 30.

Figure 2:
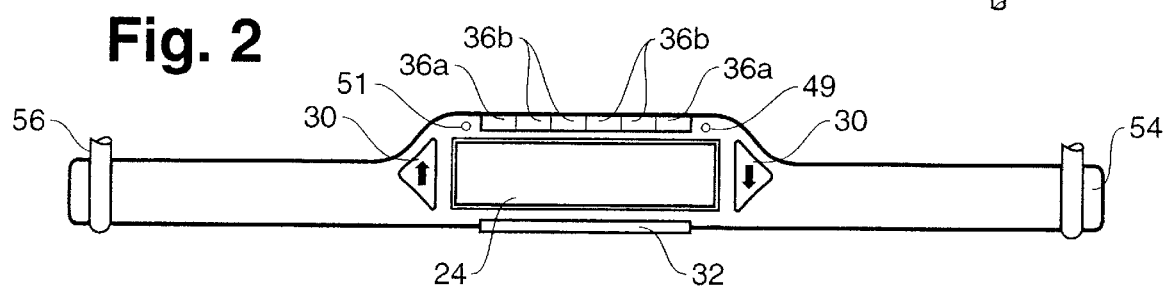
FIG. 2 is a front view of the handle of FIG. 1.

The display device 12 also includes a radiation window 34 centrally located above display screen 24. The radiation window includes multiple cells 36, which may comprise receivers for receiving microwave, infrared or other air propagated radiation energy for power supplementation or for reception of external data or control signals transmitted by microwave, infrared or radio signals. For example, in the device of FIG. 2, end cells 36a are utilized for receiving trigger signals emitted from signal transmitters positioned at strategic locations at the perimeter of a shopping establishment to trigger an alarm on the cart and at a central monitoring station in the establishment. Also, the cells 36a may be used to receive trigger or message signals from transmitters positioned strategically along each side of grocery aisles. These signals activate display of select promotional advertisements on the display screen as described in the referenced patent. The cells 36a are preferably used to receive digital message signals from the strategically positioned transmitters as described in greater detail with reference to the operation of the preferred embodiments.

Central cells 36b are utilized as power reception cells for receiving power from a radiation power source which may be advantageously located over a shopping cart corral or storage area. While the cells 36b may be constructed as solar cells, the power generation from ambient light is too small to be of much help to recharge currently available portable power components. Alternately, the radiation window 34 receives acoustical energy using ultrasonic acoustical wave patterns. The acoustical wave patterns emitted from acoustical emitters are received by audio transducers (not shown) and processed in a similar manner as infrared transmissions.

The unitary construction of the display device 12 and hand bar 16 enables the relatively large volume of the hand bar 16 to be utilized as a space for a power pack 40. Thus, a relatively substantial battery pack can be formed in the hand bar without intruding on the compact size of the display device.

Figure 3:
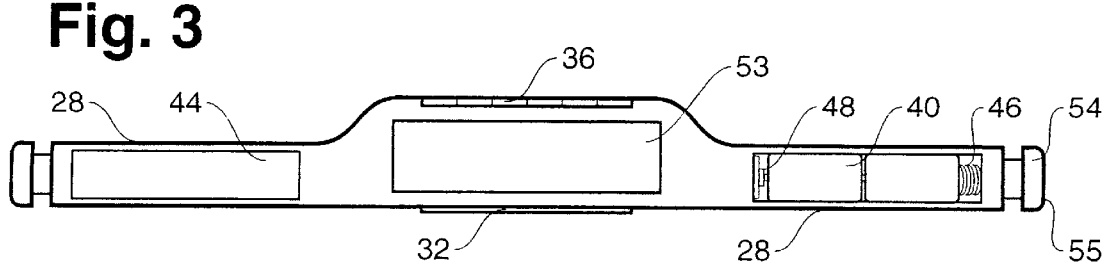
FIG. 3 is a bottom view of the handle of FIG. 1.
Figure 4:
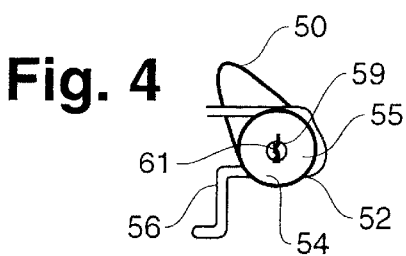
FIG. 4 is an end view of the handle of FIG. 1.

In the embodiment shown in FIG. 3, the power or battery pack 40 comprises four standard size "D" alkaline batteries 42 located in the hand grip sections 28 of the hand bar 18. As shown in FIG. 3, the power pack 40 has access covers 44, one of which is removed, to show a conventional coil spring contact 46 and a leaf spring contact 48 for tapping the electrical potential of the batteries. The batteries on each side are interconnected in series to provide a 6 volt potential for the customary 5 volt operating components. A preferably red, low-battery, cue light 49 is positioned above the display screen 24 opposite a green cue light 51 for sale items being flashed on the screen.

Where extreme miniaturization is employed for the display device 12, the internal electronic components (not shown) are confined to the crown portion 50 of the handle 10 profiled in FIG. 4, with the entire cylindrical bar portion 52 dedicated to a battery pack for maximized operating life between battery replacement or recharge of rechargeable batteries. An access cover 53 on the back of the unit provides access to the electronic components.

The shopping cart handle 10 includes an attachment mechanism 54 for mounting the handle to a convention shopping cart 20 with minimal modification to the particular cart. The attachment mechanism may vary according to the construction of the cart. For example, where a cart has a wire frame loop 56 as shown in FIG. 1, end plugs 55 having a lock 59 with a slot 61 for a locking key (not shown) may be used to lock the handle 10 to the cart 20 and allow only restricted removal of the handle from the cart during servicing or replacement.

The alternate embodiment of the display device 61 shown in FIG. 11, is not of a unitary construction and includes a display unit 63 mounted to a conventional existing shopping cart push bar 77 by clamping mechanism 78. The display unit 63 has identical button controls 33 and 35 on each side of the display screen 79 accessible by either one of the user's thumbs.

To successfully implement a shopping cart display handle onto an inventory of shopping carts, there must exist a high benefits/costs ratio. The device of this invention is highly beneficial both as a new promotional medium and as a useful shopper's aid. Costs can be minimized by low initial capital costs and importantly low maintenance costs. optimizing power management to reduce service time, particularly for recharging the power pack, substantially reduces maintenance costs. Fortunately, the preferred low-profile design utilizes a relatively compact, inexpensive display screen, approximately two inches in height by four inches in width. As the display screen is the largest power user, the minimized size coupled with an efficient power management program, which deactivates the screen during periods of non-use, enables an extended power pack life. A preferred screen for maximized contrast with minimized power consumption is a liquid crystal display module utilizing a super-twisted, nematic crystal technology with an ultra-thin, polymer film layer (STN with FILM) for maximum contrast and viewing angle. A screen with a graphic display detail of 240×80 pixels would be adequate for text and advertisement logos. For convenience, the promotional text and pictorial composite displayed on the display screen is called a screen graphic. A double retardation film LCD of this pixel density manufactured by Hitachi is suitable. Miniature color screens as utilized in portable game devices by Nintendo, Sega and NEC may be used with appropriate power management.

A low power driver/controller chip such as the Hitachi HD66108T controls the screen, with direction from a central processor for example, a Mitsubishi 24710 with add-on memory chips. Alternately, a specially designed processor chip is preferred for low power operation, such as the Intel 386SL CPV, or an inherently low-power, computer-on-a-chip, such as the F8680 of Chips & Technologies operated in a power saving Super State R mode. With the addition of conventional RAM and ROM chips for supporting the minimal memory requirements of the display device, the integrated computer chip minimizes power consumption and is programmable for controlled activation and suspension. Adoption of a 3.3V power system, for example, using an Advanced Micro Devices 386 central processing chip, will further reduce power requirements of newly designed transistors and allow six 1.5V batteries in a battery pack to be ganged in two, parallel, 3-battery packs for a greater power reserve.

Battery recharge or replacement on two month intervals is considered optimum for a low-maintenance shopping cart system with electronic display handles utilizing currently available components. A system with an optimized low voltage powering with some in-service charging may last six months.

Figure 5:
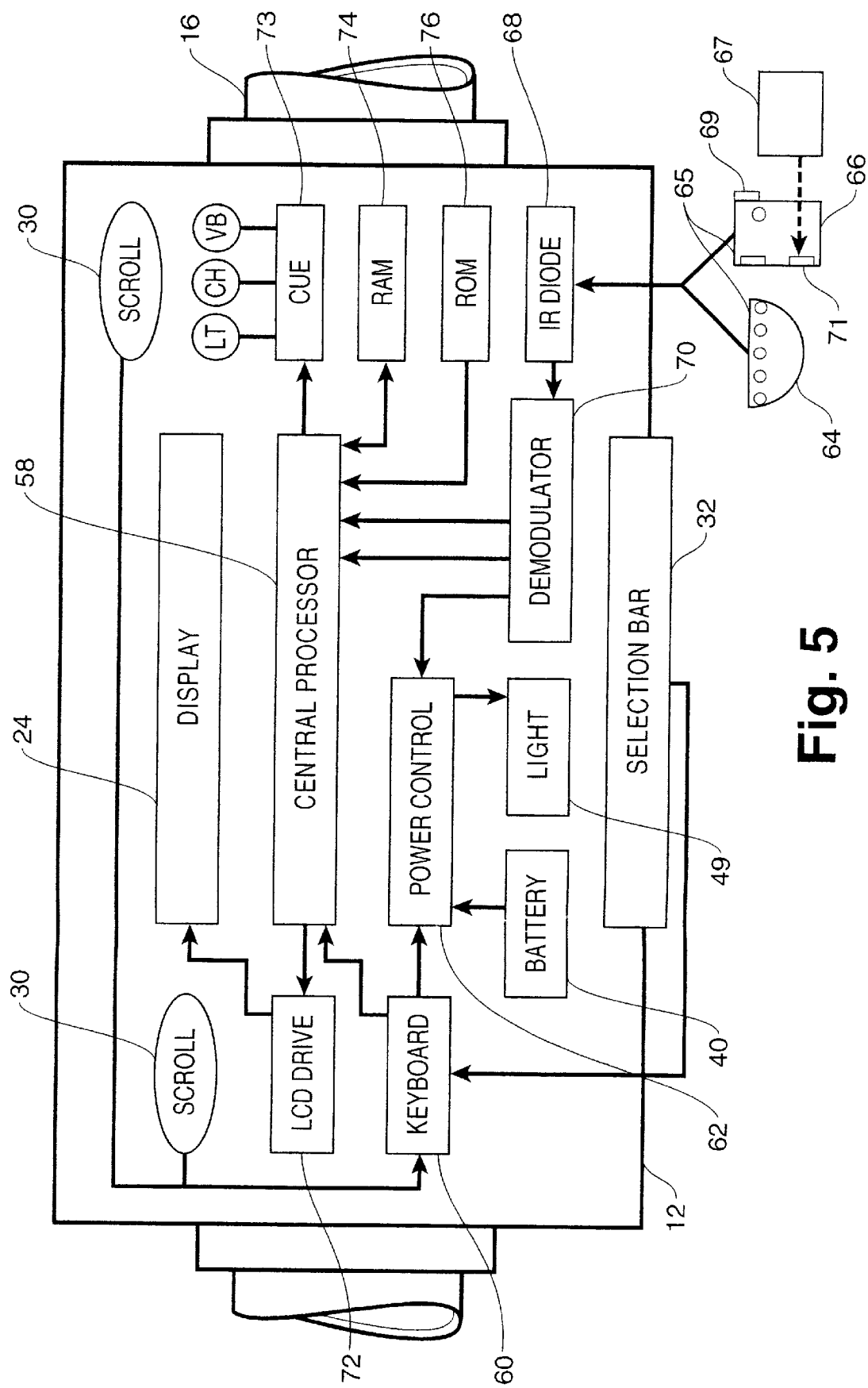
FIG. 5 is a schematic diagram of the electronic operating components in a display unit of the handle of FIG. 1.

Referring to the schematic illustration of FIG. 5, the display unit 12 contains a central processor 58 which is an integrated circuit chip for programs to control the system operation. The processor receives and directs data for operation of the display unit, and is preferably a state of the art chip, such as an Intel 286 or more expensive 386 chip. Although more advanced logic circuits are not necessary for the contemplated informational and operational tasks involved in the shopping cart handle, advanced state of the art processors can be used to advantage for power management. The processor 58 connects to a standard keyboard chip 60, which as noted, may be integrated into the processor chip. The keyboard chip 60 includes the circuity necessary to interpret signals from the scroll buttons 30 or the selection bar 32.

The keyboard chip 60 is connected to the power control circuit 62 which includes a power management program, for example, initiating screen activation upon a prompt received from the keyboard circuity when a user depresses a scroll button 30 or the selection bar 32. The power control circuit 62 is connected to the battery pack 40 and assists in regulating and triggering the power delivery to the components including the central processor 58. A low-battery warning light 49 signals the time for replacement or recharge of the battery pack 40.

External components such as an IR beacon 64 and an IR trigger component 66 direct infrared data signals and wake-up signals to the IR photodiodes 68 of the radiation window 36a on the display unit 12. The data signals provide information for reprogramming the memory of inventory and sales information and screen display of activated advertisement and promotional visuals. The IR beacon 64 may also emit a power transmission signal for charge maintenance of the battery pack 40. The IR beacon 64 and trigger component 66 form a transceiver unit 65 for receiving, storing and relaying trigger and data signals from a control unit 67, that centralizes the storewide operation of the system.

The trigger and data signals are demodulated in a converter circuit 70 and passed to the central processor 58 for reprogramming the memory or activating retrieval of memory packets for display of advertising information in the display screen 24 under control of the LCD driver and controller circuit 72. The transceiver unit 65 may be hard wired to the control unit 67 for direct communication between the control unit and transceiver unit 65. Customarily, each store would have a single control unit 67 that is the central computer for management of the stores inventory and accounting. The control unit 67 communicates with a plurality of transceiver units 65 located throughout the marketing area. Preferably, to minimize installation expenses and allow the plurality of transceiver units 65 to be repositioned in the marketing area as desired, each transceiver unit 65 is in wireless communication with the control unit 67 and has its own power supply. Essentially, the transceiver unit 65 includes the same electronic components as the display unit 12 which allows for independent processing of data and independent communication with a display unit 12 on a nearby shopping cart. To conserve power in the transceiver unit 65, the transceiver unit includes a proximity sensor 69 that detects the presence of a shopping cart within range and initiates transmission of the trigger and data signals to the unit 12 on the cart handle. The transceiver unit 65 also includes an RF receiver 71 to receive FM radio frequency transmissions from the central control unit 67. Each transceiver unit 65 can have a separate identification such that data transmitted from the control unit 67 is transmitted store wide but is processed and stored only by the transceiver unit to which the data is intended.

In the preferred embodiment, the transceiver unit 65 upon detection of a proximately located shopping cart transmits a trigger signal to wake-up the display unit on the shopping cart if not already in an activated state, then sends the data signal. The data signal is a digital signal that includes both the product control signals and the screen graphic signal. The product control signals include data about the promotion that is not in the screen graphic and that does not appear on the display screen 24 of the display unit 12. This data may include the universal product identification number, the date or iteration number of the promotional graphic, and, the identification number of the transceiver unit, which is useful in tracking the path of a shopper through the market area. The screen graphic signal contains the digitized data that is received by the display unit 12 and formatted for display on the display screen. For example, a compressed screen graphic signal must be decompressed by the central processor before it is relayed to the LCD controller and driver 72. The data signal transmitted by the transmitter unit must be sent at a rate that enables the screen graphic to be displayed within the time window available. For example, using a state-of-the-art baud rate of 9600 bits per second, and using the black and white screen 24 with an 80×240 pixel count, without compression, a bit mapped screen graphic can be transmitted in 2 seconds, the maximum time window for timely display.

Figure 9:
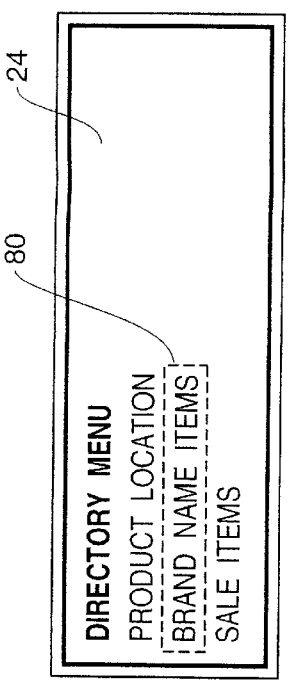
FIG. 9 is a schematic illustration of an informational screen display of a product advertisement.

The product control data is a short alphanumeric string which in seven bit ASCHII code can be transmitted in a small fraction of a second. Using standard compression algorithms for the bit-mapped screen graphic, the product control data and the promotional screen graphic can be transmitted well within the two second permissible time frame. Using advanced state-of-the-art transmission rates together with data compression, larger, higher resolution screens, and/or color can be used. The screen graphic is preferably promotional information that is related to the promotional item located proximate the transceiver unit that is transmitting the screen graphic signal. A typical screen graphic displayed in the display screen 24 is shown in FIG. 9.

The digitized screen graphic is stored in a file in the memory of the transceiver unit 65, and is periodically updated or replaced by transmissions from the control unit 67.

The trigger and data signals, together with a converted D.C. power potentials are delivered to the power control circuit for system wakeup, and trickle feed of energy to the battery pack 40. The trigger signal is passed to the cue output circuit 73, which may be one or more of an audible chime, a handle vibration or a light. Certain IR triggers 66 at the store perimeter may not only trigger an audible alarm in the display unit 12, but include a sound or ultrasound receiver for activating an alarm in the store office when a select frequency emitted by the display unit is detected.

With the display unit 12 awakened, the data signals are processed by the central processor 58 and the data relating to the screen graphic is compared with existing promotional screen graphics stored in RAM 74. The comparison of digitized screen graphics may be accomplished with a rapid checksum procedure. If a match is found, the screen graphic data is passed from a temporary storage buffer in the central processor 58 to the LCD driver 72 for display on the display screen 24. In the event that there is no match, the processor 58 processes the formatted screen data to the LCD driver 72 for display on the display screen 24 and contemporaneously passes the screen graphic display data together with the accompanying product control data to RAM 74. The screen graphic data and product control data are stored in memory for future comparison with received screen display signals or retrieval by a shopper reviewing the file of product promotions.

The product control signals may be utilized in this compare process for rapidly locating the presence or absence of a particular promotional screen graphic in memory and initiating display of either the screen graphic in memory or the screen graphic formatted from the screen graphic signal transmitted by the transceiver unit 65. In this manner, the shopping carts that are in use, are continually updated as they pass a transceiver unit 65, such that even if an outdated ad is stored in memory, the updated ad will be presented once the shopper has arrived at the location of the promoted item. Although this system has the minor drawback of potentially storing an outdated promotional graphic in memory that is accessible by a shopper during review of the product promotion file using the display unit in an interactive mode, the system is self-correcting at the promoted product location.

The random access memory (RAM) 74 and read only memory (ROM) 76 store the systems operations data and reprogrammable user data for displaying store directory and product information in the display screen 24.

Figure 6:
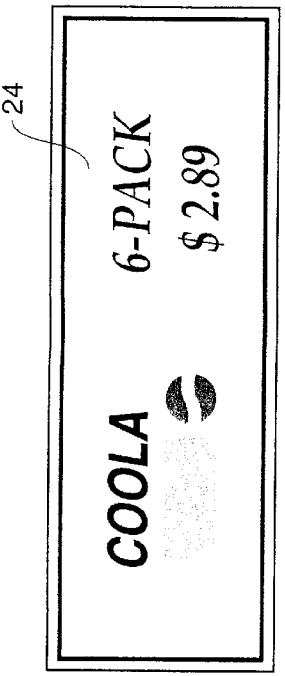
FIG. 6 is a schematic illustration of an informational screen display of a directory menu.

Although the devised shopping cart display handle will have the capabilities of a personal computer, a dedicated informational format, as schematically illustrated in FIGS. 6–10, is incorporated to ease user familiarization and encourage adoption as a shopping aid. Referring now to FIG. 6, on activation the display screen 24 first displays a directory menu allowing selection of a directory listing to be reviewed. Selection is accomplished using the selection bar 32, which highlights the heading in some manner, as by the box 80 enclosing the "BRAND NAME ITEMS" indicia in FIG. 6.

Figure 7:
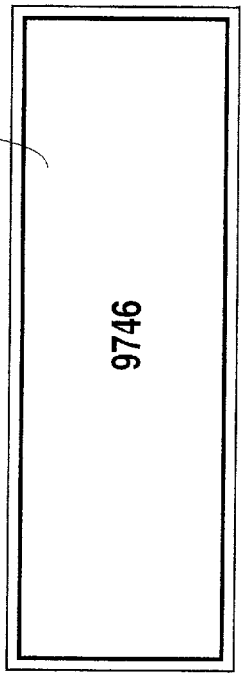
FIG. 7 is a schematic illustration of an informational screen display of a product listing by brand name.

On touching a scroll button 30, an alphabetical listing of items by brand name will be displayed for the user to scroll through to locate a particular item. Items 82 are shown with size and price for convenience as illustrated in FIG. 7.

Figure 8:
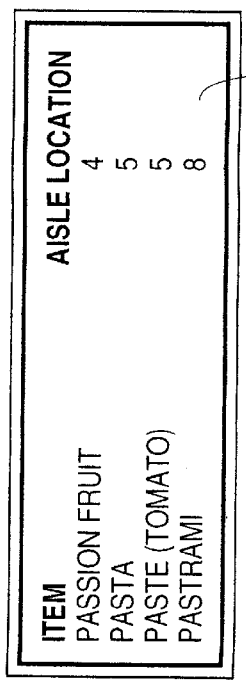
FIG. 8 is a schematic illustration of an informational screen display of a generic product location list.

To assist a user in locating items, the generic names are listed with an aisle directory listing for each category as shown in FIG. 8. In one embodiment of operation, an updatable series of advertisements, particularly select sales items for which the product producers or distributors have paid advertisement fees to the system operator, is retained in memory. Periodically, during a state of activation of the display device when the shopper is not using the display unit, the display screen is activated for a set time, for example ten seconds, and a select product advertisement is displayed as shown in FIG. 9. Preferably, the advertisement contains a sale price, as shoppers prefer not to refer to simple product name advertisements. To alert the shopper that a promotional message is being displayed, a cue signal, such as a pleasant chime, light or handle vibration is generated at the beginning of the message. The cue signal is also generated when the promotional message is activated by the transceiver units 65 located proximate the promoted product. The cue light 51 can be activated as a blinking or steady state light and may be used with one or both of the other signal alternatives, as desired. The chime and handle vibration are effected by the cue output circuit 73 which, as shown schematically in FIG. 5, develops an audio signal delivered respectively to a micro speaker (not visible in FIGS. 1–4), or piezoelectric transducer (not shown) fixed to the inside o f the handle bar to vibrate the handle.

Figure 10:
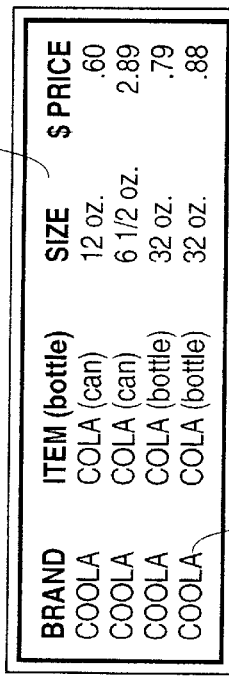
FIG. 10 is a schematic illustration of an informational screen display of a prize code number.

To improve the likelihood that the shopper will look at the display screen when cued, a prize code is intermittently flashed on the screen instead of a scheduled advertisement. This code may be in the form of an automatically reprogrammable four digit number as shown in FIG. 10. When the number is related to the check-out clerk, a monetary coupon or reduction in the check-out tally is granted.

As shoppers are sensitive to fairness in promotionals, it is preferred that the system be operated such that the shopper willingly refers to the display screen when cued.

It has been found that shoppers have limited patience with scrolling through long product lists. Therefore, the main product directory has a limited number of listed items, approximately fifty, and scrolling in any directory can be accelerated by depressing the desired scroll button 30, while at the same time holding down the selection bar 32.

The electronic, shopping-cart, display handle of this invention incorporates an informational device in a convenient, utilitarian embodiment that retains its function as a push bar for a shopping cart. Although the device can be constructed to connect to an existing shopping-cart, push bar, it is preferred that the handle comprise a unitary hand bar and display unit as shown for the preferred embodiment. This enables the location of the thumb operated display controls to be optimally positioned with respect to the comfortable grip of the user's hands on the hand bar.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An electronic, shopping-cart, informational device comprising:

an ergonomically designed display handle having two hand grip portions; a central display unit portion with the hand grip portions being arranged on each side of the display unit portion, the hand grip portions having ends connectable to a shopping cart frame, and the display unit portion having a display screen and user control means for displaying selected information on the display screen, wherein the user control means comprises thumb operated buttons located on each side of the display screen proximate the hand grip portions for scrolling information in the display screen using a thumb while the user is able to maintain a grip on the hand portion of the display handle with the hand operating thumb; automatic means for periodically displaying promotional product advertisements on the display screen; and unobtrusive cue means apart from the display screen for directing a user's attention to the display screen when a promotional product advertisement is displayed on the display screen.

2. An electronic, shopping-cart, informational device comprising:

an ergonomically designed, informational display handle for pushing a shopping cart to which the display handle is connected, the display handle having an integrated, interactive display unit for assisting a user using the display handle, the display handle having, two hand grip portions and a central display unit portion, the hand grip portions being arranged on each side of the display unit portion with the hand grip portions having ends connectable to a shopping-cart frame, wherein the interactive display unit is located at the display unit portion and has a display screen with sides and thumb operated control means located on the display unit proximate at least one side of the display screen and proximate the hand grip portion for user operation of the display screen by at least one of the user's thumbs while the user is gripping the hand grip portions of the display handle, wherein the display screen displays informational screen displays with user selectable information in the screen displays, wherein the user selects information from the screen displays using at least one of the user's thumbs, while at the same time the thumb operating hand is able to grip one of the hand grip portions of the display handle, and wherein all of the user-selectable information in the screen displays is selectable by the user's thumb without removing the user's thumb operating hand from the hand grip portion of the display handle.

3. The electronic, shopping-cart, informational device of claim 2 wherein the hand grip portions and display unit portion of the handle are of a unitary construction, and the hand grip portions have releasable connection means at their ends for connecting the display handle to a shopping cart.

4. The electronic, shopping-cart, informational device of claim 2 wherein the hand grip portions and the display unit portion of the handle are of a unitary construction, and wherein the hand grip portions are cylindrical and hollow, and have means to contain plurality of batteries of a battery pack.

5. The electronic, shopping-cart, informational device of claim 4 wherein the display unit portion has a low profile and is contoured with respect to the cylindrical hand grip portions.

6. The electronic, shopping-cart, informational device of claim 2 wherein the display unit portion has a construction with a hollow interior to contain batteries of a battery pack.

7. The electronic, shopping-cart, informational device of claim 2 wherein the display screen is centrally positioned on the interactive display unit and the thumb operated control means comprise scroll buttons arranged on each side of the display screen proximate the hand grip portions.

8. The electronic, shopping-cart, informational device of claim 7 wherein the thumb operated control means comprise further, an elongated selection bar arranged under the display screen, the bar being accessible by either thumb of a user while at the same time the user is gripping the hand grip portions of the hand bar with both hands.

9. The electronic, shopping-cart, informational device of claim 1 wherein the non-informational cue means comprises an audible chime.

10. The electronic, shopping-cart, informational device of claim 1 wherein the non-informational cue means comprises a handle vibration.

11. The electronic, shopping-cart, informational device of claim 1 wherein the non-informational cue means comprises a light.

12. The electronic, shopping-cart, informational device of claim 1 wherein the user control means comprises further, at least one thumb operated selection bar wherein the thumb operated selection bar is operable by at least one thumb of a user while the user maintains a hand grip on the hand grip portions of the display handle with both hands.

13. The electronic, shopping-cart, informational device of claim 1 wherein the hand grip portions and the display unit portion are of unitary construction.

14. The electronic, shopping-cart, informational device of claim 1 wherein the automatic means for displaying product advertisements includes transmission means external to the handle for transmitting signals for display of product advertisements.

15. The electronic, shopping-cart, informational device of claim 14 wherein the display unit portion includes a portable power pack and means for trickle charging the power pack.

16. The electronic, shopping-cart, informational device of claim 2 wherein the central display unit portion and the hand grip portions are of unitary construction with a common housing.

17. The electronic shopping-cart informational device of claim 2 wherein the central display unit portion includes means for coupling the display unit portion to the hand grip portions.

18. The electronic shopping cart informational device of claim 17 wherein the hand grip portions comprise a conventional shopping cart hand bar.

19. The electronic shopping cart informational device of claim 17 wherein the means for coupling the display unit portion to the hand grip portion comprises a clamp mechanism.

20. The electronic shopping-cart informational device of claim 2 wherein the thumb operated control means comprises at least one selection button.

21. The electronic shopping-cart informational device of claim 20 wherein the thumb operated control means comprises further, at least one scroll button proximately positioned to the selection button.

22. The electronic shopping-cart informational device of claim 2 wherein the thumb operated control means selectively displays selectable informational screen displays and selectively selects information displayed in the informational screens display.

23. The electronic shopping-cart informational device of claim 2 wherein the display screen automatically displays informational screen displays with user selectable information in the display screens and the control means selectively selects information displayed in the automatically displayed screen displays.

* * * * *